United States Patent
Vilsmeier et al.

(10) Patent No.: US 12,499,653 B2
(45) Date of Patent: Dec. 16, 2025

(54) MEDICAL IMAGE ANALYSIS USING MACHINE LEARNING AND AN ANATOMICAL VECTOR

(71) Applicant: Brainlab AG, Munich (DE)

(72) Inventors: Stefan Vilsmeier, Munich (DE); Jens Schmaler, Mering (DE)

(73) Assignee: BRAINLAB AG, Munich (DE)

( * ) Notice: Subject to any disclaimer, the term of this patent is extended or adjusted under 35 U.S.C. 154(b) by 586 days.

(21) Appl. No.: 17/783,851

(22) PCT Filed: Dec. 16, 2020

(86) PCT No.: PCT/EP2020/086421
§ 371 (c)(1),
(2) Date: Jun. 9, 2022

(87) PCT Pub. No.: WO2021/122747
PCT Pub. Date: Jun. 24, 2021

(65) Prior Publication Data
US 2023/0046321 A1 Feb. 16, 2023

(51) Int. Cl.
*G06F 17/00* (2019.01)
*G06T 7/00* (2017.01)
(Continued)

(52) U.S. Cl.
CPC .......... *G06V 10/764* (2022.01); *G06T 7/0014* (2013.01); *G06T 7/136* (2017.01);
(Continued)

(58) Field of Classification Search
CPC .... G06V 10/764; G06V 20/695; G06V 20/70; G06V 20/698; G06V 10/82; G06V 10/26;
(Continued)

(56) References Cited

U.S. PATENT DOCUMENTS 10,347,045 B1 * 7/2019 Dhua .................. G06T 17/00
10,430,946 B1 * 10/2019 Zhou .................. A61B 5/02007
(Continued)

FOREIGN PATENT DOCUMENTS

| CN | 109074665 A | 12/2018 |
|---|---|---|
| WO | 2021121600 | 6/2021 |
| WO | 2021122747 | 6/2021 |

OTHER PUBLICATIONS

International Search Report and Written Opinion for PCT Application PCT/EP2020/086421 dated Jan. 18, 2021, 15 pages.
(Continued)

*Primary Examiner* — Mohammed H Zuberi
(74) *Attorney, Agent, or Firm* — Gray Ice Higdon

(57) ABSTRACT

Disclosed is a computer-implemented method which encompasses registering a tracked imaging device such as a microscope having a known viewing direction and an atlas to a patient space so that a transformation can be established between the atlas space and the reference system for defining positions in images of an anatomical structure of the patient. Labels are associated with certain constituents of the images and are input into a learning algorithm such as a machine learning algorithm, for example a convolutional neural network, together with the medical images and an anatomical vector and for example also the atlas to train the learning algorithm for automatic segmentation of patient images generated with the tracked imaging device. The trained learning algorithm then allows for efficient segmentation and/or labelling of patient images without having to register the patient images to the atlas each time, thereby saving on computational effort.

15 Claims, 12 Drawing Sheets

(51) Int. Cl.
  *G06T 7/136* (2017.01)
  *G06T 7/70* (2017.01)
  *G06V 10/26* (2022.01)
  *G06V 10/764* (2022.01)
  *G06V 10/774* (2022.01)
  *G06V 10/82* (2022.01)
  *G06V 20/69* (2022.01)
  *G06V 20/70* (2022.01)

(52) U.S. Cl.
  CPC .............. *G06T 7/70* (2017.01); *G06V 10/26* (2022.01); *G06V 10/774* (2022.01); *G06V 10/82* (2022.01); *G06V 20/695* (2022.01); *G06V 20/698* (2022.01); *G06V 20/70* (2022.01); *G06T 2207/10056* (2013.01); *G06T 2207/10061* (2013.01); *G06T 2207/20081* (2013.01); *G06T 2207/20084* (2013.01); *G06T 2207/30004* (2013.01); *G06V 2201/03* (2022.01)

(58) Field of Classification Search
  CPC ......... G06V 10/774; G06T 7/136; G06T 7/70; G06T 7/0014
  See application file for complete search history.

(56) References Cited

U.S. PATENT DOCUMENTS

| | | | |
|---|---|---|---|
| 11,450,003 B2* | 9/2022 | Li | A61B 8/483 |
| 2003/0210820 A1 | 11/2003 | Lachner | |
| 2010/0061632 A1* | 3/2010 | Young | G06T 7/70 |
| | | | 382/218 |
| 2012/0027272 A1* | 2/2012 | Akinyemi | G06T 7/11 |
| | | | 382/128 |
| 2014/0247977 A1* | 9/2014 | Han | G06T 7/11 |
| | | | 382/159 |
| 2016/0063720 A1 | 3/2016 | Han | |
| 2017/0213339 A1 | 7/2017 | Hibbard et al. | |
| 2017/0330325 A1 | 11/2017 | Blumhofer | |
| 2018/0033144 A1* | 2/2018 | Risman | G06T 7/0014 |
| 2019/0014979 A1* | 1/2019 | Czupalla | A61B 1/00165 |
| 2019/0251694 A1 | 8/2019 | Han | |
| 2019/0320934 A1 | 10/2019 | Odry et al. | |
| 2019/0340752 A1* | 11/2019 | Brestel | G16H 30/40 |
| 2021/0158510 A1* | 5/2021 | Huang | G06T 7/62 |
| 2022/0114389 A1* | 4/2022 | Ghose | G06V 10/25 |
| 2022/0392198 A1* | 12/2022 | Kroenke | G06T 7/0012 |

OTHER PUBLICATIONS

Criminisi et al., "Decision Forests: A Unified Framework for Classification, Regression, Density Estimation, Manifold Learning and Semi-Supervised Learning" Foundations and Trends in Computer Graphics and Vision. vol. 7, Nos. 2-3. (2011). https://www.microsoft.com/en-us/research/wp-content/uploads/2016/02/CriminisiForests_FoundTrends_2011.pdf.

China National Intellectual Property Administration, First Office Action issued in Application No. 201980078509.9, 24 pages, dated Mar. 30, 2024.

* cited by examiner

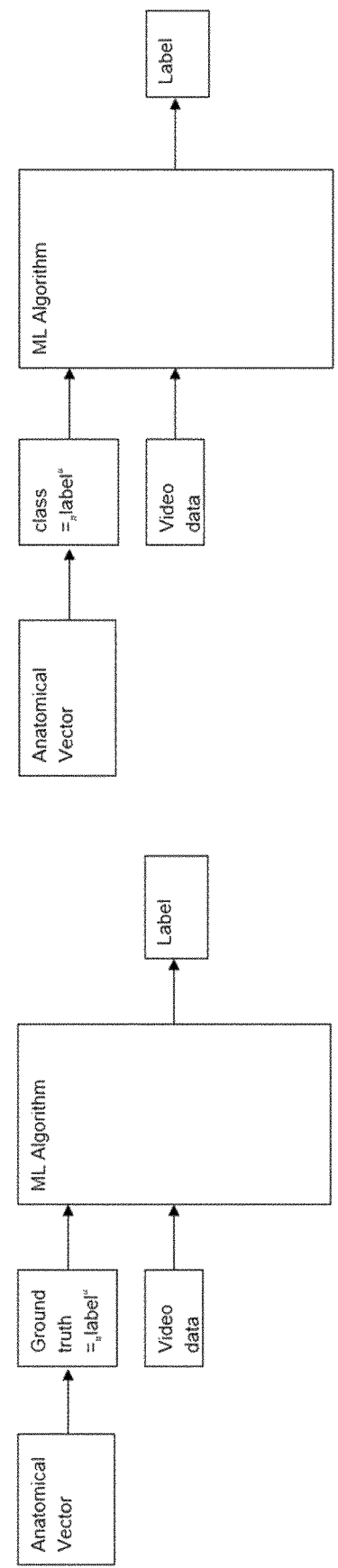

| Embodiment No. | Application type | Anatomical vector used for | Input of ML algorithm | | Output of ML algorithm | Kind of training | Registration requirements |
|---|---|---|---|---|---|---|---|
| | | | Training | Testing | | | |
| 1 | segmentation/ localization | creating groundtruth segmentation from registered atlas | video images + ground truth segmentation | video images | segmentation/ localization | supervised | elastic + intraop update |
| 2 | classification | creating ground truth class from registered atlas | video images + groundtruth class | video images | class | supervised | rigid or better (but depends on what shall be classified) |
| 3 | segmentation/ localization | creating class from registered atlas | video images + class | video images | segmentation/ localization | weakly supervised | rigid or better (depends on what shall be localized) |

| Embodiment No. | application type | anatomical vector used for | input of ML algorithm | | output of ML algorithm | kind of training | Registration requirements |
|---|---|---|---|---|---|---|---|
| | | | Training | Testing | | | |
| 5 | classification/ segmentation/ localization | additional input (raw numbers) | video images + anatomical vectors + label (manually created) | video images + anatomical vectors | class or segmentation or localization | supervised | depends on application type |

Fig. 9a

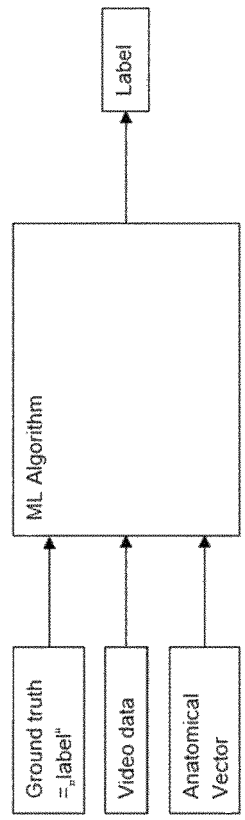

Fig. 9b

| Embodiment No. | application type | anatomical vector used for | input of ML algorithm | | output of ML algorithm | kind of training | Registration requirements |
|---|---|---|---|---|---|---|---|
| | | | Training | Testing | | | |
| 6 | classification/ segmentation/ localization | additional input (raw numbers) | video images + anatomical vectors + undeformed atlas + label (manually created) | video images + anatomical vectors + undeformed atlas | class or segmentation or localization | supervised | depends on application type |

Fig. 10a

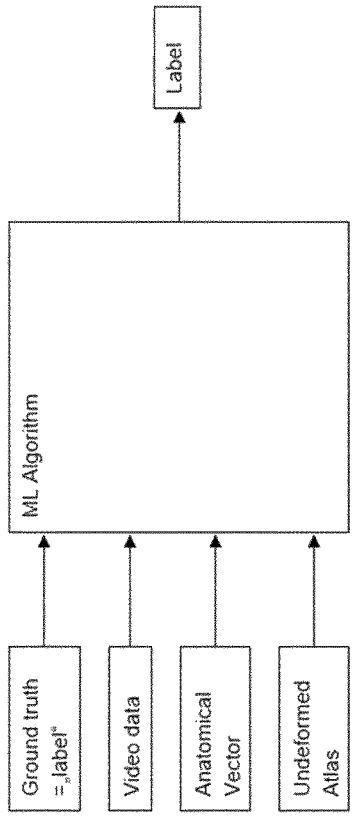

Fig. 10b

| Embodiment No. | application type | anatomical vector used for | input of ML algorithm | | output of ML algorithm | kind of training | Registration requirements |
|---|---|---|---|---|---|---|---|
| | | | Training | Testing | | | |
| 7 | classification/ segmentation/ localization | constraining of atlas | video images + constrained undeformed atlas + label (manually created) | video images + constrained undeformed atlas | class or segmentation or localization | supervised | rigid or better |

Fig. 11a

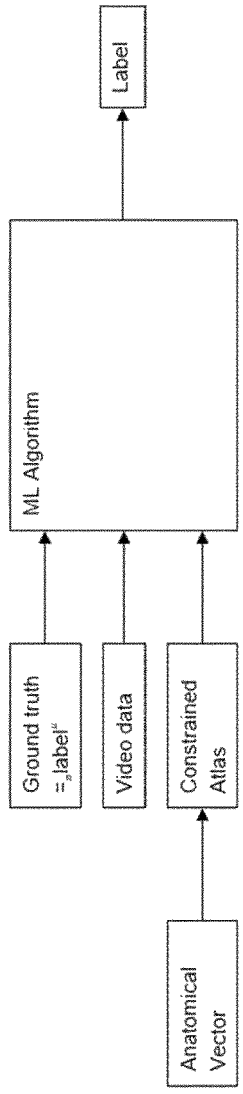

Fig. 11b

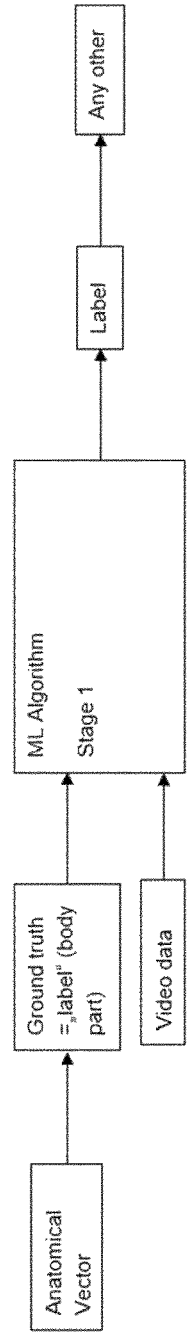

| Embodiment No. | application type | anatomical vector used for | input of ML algorithm | | output of ML algorithm | kind of training | Registration requirements |
|---|---|---|---|---|---|---|---|
| | | | Training | Testing | | | |
| 8 | classification / segmentation / localization | creation of ground truth for first-stage body part classifier | first stage: video images + ground truth<br><br>second stage: any other | first stage: video images<br><br>second stage: any other | class or segmentation or localization | supervised | rigid or better |

| Embodiment No. | Application type | Anatomical vector used for | Input of ML algorithm | | Output of ML algorithm | Kind of training | Registration requirements |
|---|---|---|---|---|---|---|---|
| | | | Training | Testing | | | |
| 9 | classification/ segmentation/ localization | creating a ground truth for creating a curriculum data pool | any other | any | class or segmentation | supervised | rigid or better |

# MEDICAL IMAGE ANALYSIS USING MACHINE LEARNING AND AN ANATOMICAL VECTOR

FIELD OF THE INVENTION

The present invention relates to a computer-implemented method of training a learning algorithm for determining a relation between a label for indicating a position or type of an anatomical structure in a medical image on the one hand and the position or type of the anatomical structure in the medical image on the other hand as wells as methods of using the trained learning algorithm for segmenting and/or labelling medical patient images, a corresponding computer program, a computer-readable storage medium storing such a program and a computer executing the program, as well as a system comprising an electronic data storage device and the aforementioned computer.

TECHNICAL BACKGROUND

Medical patient images can be segmented or labelled using an anatomical atlas. This requires registering the patient images to the atlas which is associated with considerable computational effort.

US 2017/0213339 A1 discloses a method and system for segmenting medical images which uses a learning algorithm as an anatomical classifier for registering a patient image with an atlas image.

US 2019/0320934 A1 discloses automated sequence prediction for a medical imaging session including a self-assessment mechanism. An initial scout sequence is performed of a patient or object. The initial scout sequence is validated. An abbreviated acquisition protocol is performed. The abbreviated acquisition protocol is validated. Additional sequences are performed. The sequences may also be configured based on the analysis of the previous scans using deep learning-based reasoning to select the next appropriate settings and procedures.

US 2017/0330325 A1 discloses a matching transformation for matching a patient image set of images of an anatomical body structure of a patient with an atlas image set of images of a general anatomical structure including anatomical atlas elements. Atlas spatial information containing spatial information on the general anatomical structure, and element representation information are obtained. The element representation information describes representation data sets which contain information on representations of the plurality of atlas elements in the atlas images to be determined are obtained, and also describes a determination rule for determining respective representation data sets for respective atlas elements in accordance with different respective parameter sets. Patient data is acquired by acquiring the patient image set and the parameter sets which are respectively associated with the images of the patient image set. The matching transformation is determined by matching images associated with the same parameter set to each other.

The present invention has the object of providing methods for more efficient segmentation and/or labelling of medical patient images.

Aspects of the present invention, examples and exemplary steps and their embodiments are disclosed in the following. Different exemplary features of the invention can be combined in accordance with the invention wherever technically expedient and feasible.

Exemplary Short Description of the Invention

In the following, a short description of the specific features of the present invention is given which shall not be understood to limit the invention only to the features or a combination of the features described in this section.

The disclosed methods encompass registering a tracked imaging device such as a microscope having a known viewing direction and an atlas to a patient space so that a transformation can be established between the atlas space and the reference system for defining positions in images of an anatomical structure of the patient. Labels are associated with certain constituents of the images and are input into a learning algorithm such as a machine learning algorithm, for example a convolutional neural network, together with the medical images and an anatomical vector and for example also the atlas to train the learning algorithm for automatic segmentation of patient images generated with the tracked imaging device. The trained learning algorithm then allows for efficient segmentation and/or labelling of patient images without having to segment the patient images using a registered atlas each time, thereby saving on computational effort.

General Description of the Invention

In this section, a description of the general features of the present invention is given for example by referring to possible embodiments of the invention.

In general, the invention reaches the aforementioned object by providing, in a first aspect, a computer-implemented method (for example, medical method) of training a learning algorithm for determining a relation between a label for indicating a position or type of an anatomical structure in a medical image on the one hand and the position or type of the anatomical structure in the medical image on the other hand. The method according to the first aspect comprises executing, on at least one processor of at least one computer (for example at least one computer being part of a navigation system), the following exemplary steps which are executed by the at least one processor.

In a (for example first) exemplary step of the method according to the first aspect, patient training image data is acquired which describes digital medical images of an anatomical structure of a plurality of patients. For example, the medical image is a two-dimensional image such as a microscope image, for example part of a video taken with a microscope, wherein the imaging device is for example a microscope. The patient training image data has been generated for example from an image or video taken with an imaging device which generates two-dimensional images such as a digital microscope or camera or an endoscope equipped with a digital camera, or with an x-ray device that produces or is configured to produce two-dimensional projection images. However, the patient training image data may in other examples have been generated by applying any other applicable imaging modality to the anatomical structure, for example magnetic resonance tomography or computed x-ray tomography or radiography or ultrasound imaging.

In a (for example second) exemplary step of the method according to the first aspect, atlas data is acquired which describes an anatomical model of the anatomical body part including the anatomical structure. The anatomical model is for example a three-dimensional synthesized anatomical model which is defined for example by tissue classes. The tissue classes have been generated for example from medical image data of the anatomical body part, for example for a plurality of patients.

In a (for example third) exemplary step of the method according to the first aspect, viewing direction data is acquired which describes the viewing direction of an imaging device towards the anatomical structure at the point in time when the imaging device was used to generate the medical image. The viewing direction has for example been determined by tracking the imaging device with a tracking system working on the principle of marker-based tracking (i.e. optically detecting retroreflective markers which are attached to the imaging device in a predetermined and known relationship relative to its viewing direction), video tracking or electromagnetic tracking. The viewing direction can further be based on or defined by the geometry of the imaging device, and on the optics, e.g. the field of view or the focal axis of the imaging device, or e.g. a focal point, e.g. position of a focal spot of the imaging devices. The viewing direction comprises e.g. a direction normal to the imaging plane. The viewing direction for example comprises or is defined by the position of a camera and the orientation of a camera. In addition, the viewing direction data comprises for example information defining focus, zoom or magnification of the imaging device. It additionally or alternatively comprises for example information defining the position of the edges or corners of the image or of the field of view, e.g. in relation to the position of the imaging device. For an imaging device using x-rays and comprising a substantially flat x-ray detector, the viewing direction data can comprise or be defined by for example the normal of the detector area or it can comprise for example information defining the centre of the detector area or e.g. the centre of an area defined by collimator blades near the x-ray detector or near the x-ray source. In an example, the viewing direction is generated by imaging x-ray opaque markers with x-rays having a predetermined, for example known, geometry and/or predetermined, for example known, position relative to the anatomical structure, and comparing the appearance of the markers in at least one resulting x-ray image to the predetermined, for example known, geometry or position to the anatomical structure, respectively. Where in this disclosure features of the invention are mentioned in the context of video images, they may likewise be combined with any other type of imaging modality such as still image digital photography or radiography or DRRs or three-dimensional imaging modality such as computed x-ray tomography or magnetic resonance tomography or ultrasound tomography.

In a (for example fourth) exemplary step of the method according to the first aspect, anatomical vector data is determined based on the viewing direction data and the atlas data, wherein the anatomical vector data describes an anatomical vector which is a result of transforming the viewing direction into a reference system in which positions in the anatomical model are defined.

This transformation from the viewing direction data into the anatomical vector data is e.g. performed by the following steps a) to c):

a) The coordinates of the position and orientation of the tracked imaging device, that are defined in or example the coordinate system of a tracking system, e.g. relative to the stereoscopic tracking camera of an optical tracking system, are transformed into the same coordinate system as the patient (e.g. by optical or other tracking markers attached to the patient), which is e.g. an intraoperative coordinate system of the patient.

b) The positions in planning image data, e.g. computed tomography images, e.g. from x-ray or magnetic resonance tomography, taken of the patient, are transformed into the patient coordinate system of the patient (e.g. using artificial, e.g. radio-opaque markers, or natural landmarks in the preoperative image data). The coordinate system of the planning image data is e.g. defined by the coordinate system of the imaging device used for acquisition of the planning image data, e.g. a computer tomography scanner or a magnetic resonance imaging scanner. The planning image data is e.g. acquired pre-operatively.

c) Then, the positions which have been transformed into the patient coordinate system are transformed into the coordinate system of an anatomical atlas, using a registration of the planning image data to the atlas, the registration can be e.g. rigid, e.g. an affine transformation, or elastic, e.g. a deformation of the image data. After registration, the deformed image data coincide with at least a part of the atlas or at least a part of the deformed atlas coincides with the image data.

The result of the above transformation steps a) to c) is that all coordinates given in any of the coordinate systems, e.g. the coordinates in the pre-operative image data, the coordinates of the viewing direction of the imaging device, the coordinates of the tracking system and all tracked devices by the tracking system, and the patient coordinates, can all be expressed in an atlas coordinate system, which is not specific to an individual patient. The transformation process is also called "registration"; the tracked imaging device is thereby registered into the atlas coordinate system. The anatomical vector data comprise e.g. the viewing direction data of the imaging device expressed in an atlas coordinate system, e.g. the viewing direction coordinates transformed into coordinates of an atlas coordinate system.

In a (for example fifth) exemplary step, label data is acquired which describes a label describing the position or type of the anatomical structure in the anatomical model.

In a (for example sixth) exemplary step of the method according to the first aspect, anatomical indicator data is determined based on the patient training image data and the anatomical vector data and the label data, wherein the anatomical indicator data describes model parameters (for example, weights) of a learning algorithm for establishing the relation (e.g. a relative position or an assignment) between the position or type of the anatomical structure described by the medical image and the label, wherein the anatomical indicator data is determined by inputting the patient training image data and the label data into a function which establishes the relation. For example, the learning algorithm comprises or consists of a machine learning algorithm. For example, the learning algorithm comprises or consists of a convolutional neural network. For example, the model parameters define the learnable parameters, for example weights, of the learning algorithm. For example, the anatomical indicator data is determined by additionally inputting a subset of the atlas data which has been determined based on the atlas data and the anatomical vector data into the function which establishes the relation. The subset is for example a real subset, i.e. a subset having fewer elements, i.e. fewer data, than the atlas data.

In an example of the method according to the first aspect, additional data is acquired which is a function of the anatomical vector. The anatomical indicator data is then determined by additionally inputting the additional data into the function which establishes the relation. For example, the additional data comprises or consists of the anatomical vector data.

In a second aspect, the invention is directed to a computer-implemented method (for example, medical method) of determining a relation between a label for indicating a position or type of an anatomical structure in a medical image on the one hand and the position or type of the anatomical structure in the medical image on the other hand. The method according to the second aspect comprises executing, on at least one processor of at least one computer (for example at least one computer being part of a navigation system), the following exemplary steps which are executed by the at least one processor.

In a (for example first) exemplary step of the method according to the second aspect, individual patient image data is acquired which describes a digital individual medical image of an anatomical structure of an individual patient. The individual medical image has for example been generated using the same imaging modality as the one which was used for generating the patient training image data.

In a (for example second) exemplary step of the method according to the second aspect, label relation data is determined which describes a relation (e.g. a relative position or an assignment) between the label and the anatomical structure in the individual medical image, wherein the label relation data is determined by inputting the individual patient image data into a function which establishes the relation between the anatomical structure described by the individual medical image and the label, the function being part of a learning algorithm which has been trained by executing the method according to the first aspect as far as it includes inputting only the patient training image data and the label data as training data into the function which establishes the relation.

In a third aspect, the invention is directed to a computer-implemented method (for example, medical method) of determining a relation between a label for indicating a position or type of an anatomical structure in a medical image on the one hand and the position or type of the anatomical structure in the medical image on the other hand. The method according to the third aspect comprises executing, on at least one processor of at least one computer (for example at least one computer being part of a navigation system), the following exemplary steps which are executed by the at least one processor.

In a (for example first) exemplary step of the method according to the third aspect, individual patient image data is acquired which describes a digital individual medical image of an anatomical structure of an individual patient. The individual medical image has for example been generated using the same imaging modality as the one which was used for generating the patient training image data. The individual medical image is a two-dimensional image such as a microscope image, for example part of a video taken with a microscope, wherein the imaging device is for example a microscope.

In a (for example second) exemplary step of the method according to the third aspect, atlas data is acquired which describes an anatomical model of the anatomical body part including the anatomical structure. The description of the anatomical model offered above for the method according to the first aspect equally applies to the anatomical model used in the method according to the third aspect.

In a (for example third) exemplary step of the method according to the third aspect, individual viewing direction data is acquired which describes a viewing direction of an imaging device towards the anatomical structure at the point in time when the imaging device was used to generate the individual medical image. The viewing direction has for example been determined by tracking the imaging device with a tracking system working on the principle of marker-based tracking (i.e. optically detecting retroreflective markers which are attached to the imaging device in a predetermined and known relationship relative to its viewing direction), video tracking or electromagnetic tracking.

In a (for example fourth) exemplary step of the method according to the third aspect, individual anatomical vector data is determined based on the individual viewing direction data and the atlas data, wherein the anatomical vector data describes an anatomical vector which is a result of transforming the viewing direction into a reference system in which positions in the anatomical model are defined. For example, wherein a relative position between the imaging device, for example microscope, used for generating the individual patient image data and the individual anatomical vector data is predetermined, for example known, and for example acquired by the method. In a (for example fifth) exemplary step of the method according to the third aspect, additional data is acquired which is a function of the individual anatomical vector. For example, the additional data comprises or consists of the individual anatomical vector data.

In a (for example sixth) exemplary step of the method according to the third aspect, label relation data is determined which describes a relation (e.g. a relative position or an assignment) between a label and the anatomical structure described by the individual medical image, wherein the label relation data is determined by inputting the individual patient image data and the additional data into a function which establishes the relation between the position or type of the anatomical structure in the individual medical image and the label, the function being part of a learning algorithm which has been trained by executing the method according to the first aspect as far as it includes inputting the patient training image data and the label data and the additional data as training data into the function which establishes the relation. The function of the anatomical vector used for generating the acquired additional data is the same as the function of the anatomical vector used to generate the additional data input into the function which establishes the relation for determining the anatomical indicator data.

In an example of the method according to the third aspect, the additional data comprises or consists of the individual anatomical vector data, and the learning algorithm has been trained by additionally inputting the additional data into the function which establishes the relation.

In an example of the method according to the third aspect, the label relation data is determined additionally based on the atlas data by additionally inputting a subset of the atlas data into the function which establishes the relation between the anatomical structure described by the individual medical image and the label, and the learning algorithm has been trained by additionally inputting a subset of the atlas data which has been determined based on the atlas data and the anatomical vector data into the function which establishes the relation. The subset is for example a real subset, i.e. a subset having fewer elements, i.e. fewer data, than the atlas data.

In the methods according to the second and third aspect, the learning algorithm for example comprises or consists of a machine learning algorithm, for example a convolutional neural network. In the methods according to the second and third aspect, the model parameters define the learnable parameters, for example weights, of the learning algorithm.

In one example of the methods according to the first, second and third aspects, the learning algorithm may be a random forest algorithm. According to Antonio Criminisi, Jamie Shotton, Ender Konukoglu: "Decision Forests: A Unified Framework for Classification, Regression, Density Estimation, Manifold Learning and Semi-Supervised Learning" (2011), https://www.microsoft.com/en-us/research/wp-content/uploads/2016/02/CriminisiForests_FoundTrends_2011.pdf, random forests can be explained as follows:

Random forests or are an ensemble learning method for classification or regression that operates by constructing a multitude of decision trees at training time and outputting the class that is the mode of the classes (classification) or mean prediction (regression) of the individual trees.

The basic building block of a random forest is a single decision tree. A decision tree is a set of questions organized in a hierarchical manner and represented graphically as a tree. A decision tree estimates an unknown property (the "label") of an object by asking successive questions about its known properties (the so-called "features"). Which question to ask next depends on the answer of the previous question and this relationship is represented graphically as a path through the tree which the object follows. The decision is then made based on the terminal node on the path (the so-called "leaf-node"). Each question corresponds to an internal node (so-called "split-node") of the tree.

Each split node has associated to it a so-called test function. We formulate a test function at a split node j as a function with binary outputs $$H(v, \theta_j): \mathcal{F} \times \mathcal{T} \to \{9,1\},$$

where 0 and 1 can be interpreted as "false" and "true" respectively, $\theta_j \in \mathcal{T}$ denotes the parameters of the test function at the j-th split node.

v thereby is the current object ("data point") denoted by a vector $v=(x_1, x_2, \ldots, x_d) \in \mathcal{F}$, where the components $x_i$ represent some attributes of the data point (the features), all of which form the Feature space $\mathcal{F}$.

In the simplest form, the test function is a linear model which selects one feature axis in the feature space and classifies each data point according to whether the value of the respective feature is below or above a learnable threshold. Other more complex, non-linear test functions are possible.

In order to train a decision tree, we use a set of training data points for which both the features as well as the desired label are known. The goal of the training is to automatically learn suitable test functions at all the split-nodes which are best suited to determine the label from the features of a data point. Later on, such a trained decision tree can then be evaluated for a new data point with unknown label by sending the data point through the trained tree based on its features.

For understanding the training procedure, it is useful to denote subsets of training points as being associated with different tree branches. For instance $S_1$ denotes the subset of training points reaching node 1 (nodes are numbered in breadth-first order starting from 0 for the root F, and $S_1^L$, $S_1^R$ denote the subsets going to the left and to the right children of node 1, respectively.

The training takes care of selecting the type and parameters of the test function $h(v, \theta_j)$ associated with each split node (indexed by j) by optimizing a chosen objective function defined on an available training set.

The optimization of the split functions proceeds in a greedy manner. At each node j, depending on the subset of the incoming training set $S_j$ we learn the function that "best" splits $S_j$ into $S_j^R$ and $S_j^L$. This problem is formulated as the maximization of an objective function at that node $$\Theta_j^* = \arg\max_{\theta_j \in \tau} I_j$$

with $$I_j = I(S_j, S_j^L, S_j^R, \theta_j)$$

$$S_j^L = \{(v,y) \in S_j | h(v, \theta_j) = 0\}$$

$$S_j^R = \{(v,y) \in S_j | h(v, \theta_j) = 1\}$$

As before, the symbols $S_j$, $S_j^L$, $S_j^R$ denote the sets of training points before and after the spit. The objective function is of an abstract form here. Its precise definition and the meaning of "best" depends on the task at hand (e.g., supervised or not, continuous or discrete output). For instance, for binary classification, the term "best" can be defined as splitting the training subset $S_j$ such that the resulting child nodes are as pure as possible, that is, containing only training points of a single class. In this case the objective function can, for instance, be defined as the information gain.

During training we also need to optimize the tree structure (shape). Training starts at the root node, j=0, where the optimum split parameters are found as described earlier. Thus, we construct two child nodes, each receiving a different disjoint subset of the training set. This procedure is then applied to all the newly constructed nodes and the training phase continues. The structure of the tree depends on how and when we decide to stop growing various branches of the tree. Diverse stopping criteria can be applied. For example, it is common to stop the tree when a maximum number of levels D has been reached. Alternatively, one can impose a minimum value of the maximum $\max_{\theta_j I_j}$, in other words we stop when the sought for attributes of the training points within the leaf nodes are similar to one another. Tree growing may also be stopped when a node contains too few training points. Avoiding growing full trees has been demonstrated to have positive effects in terms of generalization.

During training, randomness is injected into the trees: Instead of optimizing over the whole parameter space of the test functions, when training at the j-th node we only make available a small random subset $\tau_j \in \tau$ of parameter values. Thus, under the randomness model training a tree is achieved by optimizing each split node j by $$\Theta_j^* = \arg\max_{\theta_j \in \tau_j} I_j.$$

Due to this randomized setup, multiple decision trees can later be trained in parallel, each exploiting a different set of properties from a data point.

At the end of the training phase we obtain: (i) the (greedily) optimum weak learners associated with each node, (ii) a learned tree structure, and (iii) a different set of training points at each leaf.

After training, each leaf node remains associated with a subset of (labelled) training data. During testing, a previously unseen point traverses the tree until it reaches a leaf. Since the split nodes act on features, the input test point is likely to end up in a leaf associated with training points which are all similar to itself. Thus, it is reasonable to assume that the associated label must also be similar to that of the training points in that leaf. This justifies using the label statistics gathered in that leaf to predict the label associated with the input test point.

In the most general sense the leaf statistics can be captured using the posterior distributions $$p(c|v) \text{ and } p(y|v),$$

where c and y represent the discrete or continuous labels, respectively. v is the data point that is tested in the tree and the conditioning denotes the fact that the distributions depend on the specific leaf node reached by the test point.

Different leaf predictors can be used. For instance, a Maximum A-Posteriori (MAP) estimate may be obtained as $c^*=\arg\max_c p(c|v)$, in the discrete case.

Based on the above construction principle for decision trees, we can now proceed to decision forests, also called random forests:

A random decision forest is an ensemble of randomly trained decisions trees. The key aspect of the forest model is the fact that its component trees are all randomly different from one another. This leads to decorrelation between the individual tree predictions and, in turn, results in improved generalization and robustness.

In a forest with T trees we use the variable $t \in \{1, \ldots, T\}$ to index each component tree. All trees are trained independently (and possibly in parallel). During testing, each test point v is simultaneously pushed through all trees (starting at the root) until it reaches the corresponding leaves. Tree testing can also often be done in parallel, thus achieving high computational efficiency on modern parallel CPU or GPU hardware. Combining all tree predictions into a single forest prediction may be done by a simple averaging operation. For instance, in classification $$p(c|v) = \frac{1}{T}\sum_{t=1}^{T} p_t(c|v),$$

where $p_t(c|v)$ denotes the posterior distribution obtained by the t-th tree. Alternatively, one could also multiply the tree outputs together (though the trees are not statistically independent)

$$p(c|v) = \frac{1}{Z}\prod_{t=1}^{T} Pt(c|v)$$

with the partition function Z ensuring probabilistic normalization."

In one example of the methods according to the first, second and third aspects, the learning algorithm may be a convolutional neural network. In the following, an explanation of convolutional neural networks as an example of the machine learning algorithm to be used with the disclosed invention is provided with reference to FIG. 1.

Convolutional networks, also known as convolutional neural networks, or CNNs, are an example of neural networks for processing data that has a known grid-like topology. Examples include time-series data, which can be thought of as a 1-D grid taking samples at regular time intervals, and image data, which can be thought of as a 2-D or 3-D grid of pixels. The name "convolutional neural network" indicates that the network employs the mathematical operation of convolution. Convolution is a linear operation. Convolutional networks are simply neural networks that use convolution in place of general matrix multiplication in at least one of their layers. There are several variants on the convolution function that are widely used in practice for neural networks. In general, the operation used in a convolutional neural network does not correspond precisely to the definition of convolution as used in other fields, such as engineering or pure mathematics.

The main component of convolutional neural networks are artificial neurons. FIG. 1 is an example of a single neuron depicted. The node in the middle represents a neuron, which takes all inputs ($x_1, \ldots, x_n$) and multiplies them with their specific weights ($w_1, \ldots, w_n$) The importance of the input depends on the value of its weight. The addition of these computed values is called weighted sum which will be inserted into an activation function. The weighted sum z is defined as:

$$z = \Sigma_{i=0}^{n} x_i \cdot w_i \qquad (1)$$

The bias b is an input-independent value which modifies the boundaries of the threshold. The resulting value is processed by an activation function which decides whether the input will be transferred to the next neuron.

A CNN usually takes an order 1 or 3 tensor as its input, e.g., an image with H rows, W columns, and 1 or 3 channels (R, G, B colour channels). Higher order tensor inputs, however, can be handled by CNN in a similarfashion. The input then sequentially goes through a series of processing. One processing step is usually called a layer, which could be a convolution layer, a pooling layer, a normalization layer, a fully connected layer, a loss layer, etc. Details of the layers are described in the sections below.

$$x^1 \to w^1 \to x^2 \to \ldots \to x^{L-1} \to w^{L-1} \to x^L \to w^L \to z \qquad (1)$$

The above equation 5 illustrates how a CNN runs layer by layer in a forward pass. The input is $x^1$, usually an image (order 1 or 3 tensor). We note the parameters involved in the processing of the first layer collectively as a tensor $w^1$. The output of the first layer is $x^2$, which also acts as the input to the second layer processing. This processing proceeds until processing of all layers in the CNN has been finished, which outputs $x^L$. One additional layer, however, is added for backward error propagation, a method that learns good parameter values in the CNN. Suppose the problem at hand is an image classification problem with C classes. A commonly used strategy is to output $x^L$ as a C-dimensional vector, the i-th entry of which encodes the prediction (posterior probability that $x^1$ comes from the i-th class). To make $x^L$ a probability mass function, we can set the processing in the (L−1)-th layer as a softmax transformation of $x^{L-1}$. In other applications, the output $x^L$ may have other forms and interpretations. The last layer is a loss layer. Let us suppose t is the corresponding target (ground-truth) value for the input $x^1$, then a cost or loss function can be used to measure the discrepancy between the CNN prediction $x^L$ and the target t. Note that some layers may not have any parameters, that is, $w^i$ may be empty for some i.

In an example of a CNN, ReLu is used as an activation function for the convolutional layers and the softmax activation function provides information in order to give a classification output. The following sections will explain the purpose of the most important layers.

An input image is input to a feature learning section of a layer comprising convolution and ReLu, followed by a layer comprising pooling, which is followed by further pairwise repetitions of layers of convolution and ReLu and of pooling. The output of the feature learning section is input to a classification section which comprises layers directed to flattening, fully connecting and softmaxing.

In a convolutional layer, multiple convolution kernels are usually used. Assuming D kernels are used and each kernel is of spatial span H×W, we denote all the kernels as f. f is an order 4 tensor in $\mathbb{R}^{H \times W \times D^1 \times D}$. Similarly, we use index variables $0 \le i < H$, $0 \le j < W$, $0 \le d^1 < D^1$ and $0 \le d < D$ to pinpoint a specific element in the kernels. Also note that the set of kernels f refers to the same object as the notation $w^L$ above. We change the notation a bit to simplify the derivation. It is also clear that even if the mini-batch strategy is used, the kernels remain unchanged.

The spatial extent of the output is smaller than that of the input so long as the convolution kernel is larger than 1×1. Sometimes we need the input and output images to have the same height and width, and a simple padding trick can be used. For every channel of the input, if we pad (i.e., insert $$\left\lfloor \frac{H-1}{2} \right\rfloor$$

rows above the first row and $$\left\lfloor \frac{H}{2} \right\rfloor$$

rows below the last row, and pad $$\left\lfloor \frac{W-1}{2} \right\rfloor$$

columns the left of the first column and $$\left\lfloor \frac{W}{2} \right\rfloor$$

columns to the right of the last column of the input, the convolution output will be $H^l \times w^l \times D$ in size, i.e. having the same spatial extent as the input. [*] is the floor function. Elements of the padded rows and columns are usually set to 0, but other values are also possible.

Stride is another important concept in convolution. A kernel is convolved with the input at every possible spatial location, which corresponds to the stride s=1. However, if s>1, every movement of the kernel skip s−1 pixel locations (i.e., the convolution is performed once every s pixel both horizontally and vertically).

In this section, we consider the simple case when the stride is 1 and no padding is used. Hence, we have y (or $x^{l+1}$) in $\mathbb{R}^{H^{l+1} \times w^{l+1} \times D^{l+1}}$, with $H^{l+1}=H^l-H+1, W^{l+1}=W^l-W+1$, and $D^{l+1}=D$. In precise mathematics, the convolution procedure can be expressed as an equation:

$$y_i^{l+1}{}_{,j^{l+1},d} = \Sigma_{i=0}^H \Sigma_{j=0}^W \Sigma_d^{l}{}_{=0}^{D^l} f_{i,j,d}{}^l{}_{,d} \times x_i^{l+1}{}_{+i,j^{l+1}+j,d^l} \quad (2)$$

Equation 2 is repeated for all $0 \le d \le D = D^{l+1}$, and for any spatial location $(i^{l+1}, j^{l+1})$ satisfying $0 \le i^{l+1} < H^l - H + 1 = H^{l+1}$, $0 \le j^{l+1} < W^l - W + 1 = W^{l+1}$. In this equation, $x_i^{l+1}{}_{+i,j^{l+1}+j,d^l}$ refers to the element of $x^l$ indexed by the triplet $(i^{l+1}+i, j^{l+1}+j, d^l)$. A bias term $b_d$ is usually added to $y_i^{l+1}{}_{,j^{l+1},d}$. We omit this term in this note for clearer presentation.

A pooling function replaces the output of the net at a certain location with a summary statistic of the nearby outputs. For example, a max pooling operation reports the maximum output within a rectangular neighbourhood of a table. Other popular pooling functions include the average of a rectangular neighbourhood, the $L_2$ norm of a rectangular neighbourhood, or a weighted average based on the distance from the central pixel. In all cases, pooling helps to make the representation approximately invariant to small translations of the input. Invariance to translation means that if we translate the input by a small amount, the values of the pooled outputs do not change.

Because pooling summarizes the responses over a whole neighbourhood, it is possible to use fewer pooling units than detector units, by reporting summary statistics for pooling regions spaced k pixels apart rather than one pixel apart. This improves the computational efficiency of the network because the next layer has roughly k times fewer inputs to process.

Suppose all the parameters of a CNN model $w^1, \ldots, w^{L-1}$ have been learned, then we are ready to use this model for prediction. Prediction only involves running the CNN model forward, i.e., in the direction of the arrows in equation 1. Take the image classification problem as an example. Starting from the input $x^1$, we make it pass the processing of the first layer (the box with parameters $w^1$), and get $x^2$. In turn, $x^2$ is passed into the second layer, etc. Finally, we receive $x^1 \in \mathbb{R}^C$, which estimates the posterior probabilities of $x^1$ belonging to the C categories. We can output the CNN prediction as:

$$\arg\max_i x_i^L \quad (3)$$

Now, the problem is: how do we learn the model parameters?

As in many other learning systems, the parameters of a CNN model are optimized to minimize the loss z, i.e. we want the prediction of a CNN model to match the ground-truth labels. Suppose one training example $x^1$ is given for training such parameters. The training process involves running the CNN network in both directions. We first run the network in the forward pass to get $x^L$ to achieve a prediction using the current CNN parameters. Instead of outputting a prediction, we need to compare the prediction with the target t corresponding to $x^1$, i.e. continue running the forward pass till the last loss layer. Finally, we achieve a loss z. The loss z is then a supervision signal, guiding how the parameters of the model should be modified (updated).

There exist several algorithms for optimizing a loss function and CNNs are not limited to a specific one. An example algorithm is called Stochastic Gradient Descent (SGD). This means the parameters are updated by using the gradient estimated from a (usually) small subset of training examples.

$$w^i \leftarrow w^i - \eta \frac{\delta z}{\delta w^i} \quad (4)$$

In equation 4, the ←-sign implicitly indicates that the parameters $w^i$ (of the i-layer) are updated from time t to t+1. If a time index t is explicitly used, this equation will look like $$(w^i)^{t+1} = (w^i)^t - \eta \frac{\delta z}{\delta (w^i)^t} \quad (5)$$

In equation 4, the partial derivative $$\frac{\delta z}{\delta w^i}$$

measures the rate of increase of z with respect to the changes in different dimensions of $w^i$. This partial derivative vector is called the gradient in mathematical optimization. Hence, in a small local region around the current value of $w^i$, to move $w^i$ in the direction determined by the gradient will increase the objective value z. In order to minimize the loss function, we should update $w^i$ along the opposite direction of the gradient. This updating rule is called the gradient descent.

If we move too far in the negative gradient direction, however, the loss function may increase. Hence, in every update we only change the parameters by a small proportion of the negative gradient, controlled by r (the learning rate). $\eta>0$ is usually set to a small number (e.g., $\eta=0.001$). One update based on $x^1$ will make the loss smaller for this particular training example if the learning rate is not too large. However, it is very possible that it will make the loss of some other training examples become larger.

Hence, we need to update the parameters using all training examples. When all training examples have been used to update the parameters, we say one epoch has been processed. One epoch will in general reduce the average loss on the training set until the learning system overfits the training data. Hence, we can repeat the gradient descent updating epochs and terminate at some point to obtain the CNN parameters (e.g., we can terminate when the average loss on a validation set increases).

The last layer's partial derivatives are easy to compute. Because $x^L$ is connected to z directly under the control of parameters $w^L$, it is easy to compute $$\frac{\delta z}{\delta w^L}.$$

This step is only needed when $w^L$ is not empty. In the same spirit, it is also easy to compute $$\frac{\delta z}{\delta x^L}.$$

For example, if the squared $L_2$ loss is used, we have an empty $$\frac{\delta z}{\delta w^L}, \text{ and } \frac{\delta z}{\delta x^L} = x^L - t.$$

In fact, for every layer, we compute two sets of gradients: the partial derivatives of z with respect to the layer parameters $w^i$, and that layer's input $x_i$. The term $$\frac{\delta z}{\delta w^i},$$

as seen in Equation 4, can be used to update the current (i-th) layer's parameters. The term $$\frac{\delta z}{\delta x^i}$$

can be used to update parameters backwards, e.g., to the (i−1)-th layer. An intuitive explanation is: $x^i$ is the output of the (i−1)-th layer and $$\frac{\delta z}{\delta x^i}$$

is how $x^i$ should be changed to reduce the loss function. Hence, we could view $$\frac{\delta z}{\delta x^i}$$

as the part of the "error" supervision information propagated from z backward till the current layer, in a layer by layer fashion. Thus, we can continue the back propagation process, and use $$\frac{\delta z}{\delta x^i}$$

to propagate the errors backward to the (i−1)-th layer. This layer-by-layer backward updating procedure makes learning a CNN much easier.

Take the i-th layer as an example. When we update the i-th layer, the back propagation process for the (i+1)-th layer must have been finished. That is, we already computed the terms $$\frac{\delta z}{\delta w^{i+1}} \text{ and } \frac{\delta z}{\delta x^{i+1}}.$$

Both are stored in memory and ready for use. Now our task is to compute $$\frac{\delta z}{\delta w^i} \text{ and } \frac{\delta z}{\delta x^i}.$$

Using the chain rule, we have $$\frac{\partial z}{\partial (vec(w^i)^T)} = \frac{\partial z}{\partial (vec(x^{i+1})^T)} \frac{\partial vec(x^{i+1})}{\partial (vec(w^i)^T)}$$

$$\frac{\partial z}{\partial (vec(x^i)^T)} = \frac{\partial z}{\partial (vec(x^{i+1})^T)} \frac{\partial vec(x^{i+1})}{\partial (vec(x^i)^T)}$$

Since $$\frac{\partial z}{\partial x^{i+1}}$$

is already computed and stored in memory, it requires just a matrix reshaping operation (vec) and an additional transpose operation to get $$\frac{\partial z}{\partial vec(x^{i+1})},$$

which is the first term in the right hand side (RHS) of both equations. So long as we can compute $$\frac{\partial vec(x^{i+1})}{\partial (vec(w^i)^T)} \text{ and } \frac{\partial vec(x^{i+1})}{\partial (vec(x^i)^T)},$$

we can easily get what we want (the left hand side of both equations).

$$\frac{\partial vec(x^{i+1})}{\partial (vec(w^i)^T)} \text{ and } \frac{\partial vec(x^{i+1})}{\partial (vec(x^i)^T)}$$

are much easier to compute than directly computing $$\frac{\partial z}{\partial (vec(x^i)^T)} \text{ and } \frac{\partial z}{\partial (vec(w^i)^T)},$$

because $x_i$ is directly related to $x^{i+1}$, through a function with parameters $w^i$.

In the context of neural networks, activations serve as transfer functions between the input of a neuron and the output. They define under which conditions the node is activated, i.e. the input values are mapped to the output which, in hidden layers, serves again as one of the inputs to the succeeding neuron. There exists a vast amount of different activation functions with different characteristics.

A loss function quantifies how well an algorithm models the given data. To learn from the data and in order to change the weights of the network, the loss function has to be minimized. Generally, one can make the distinction between a regression loss and classification loss. Classification predicts output from set of finite categorical values (class labels), and regression, on the other hand, deals with prediction a continuous value.

In the following mathematical formulations, the following parameters are defined as:
n is the number of training examples
i is the i-th training example in a data set
$y_i$ is the ground truth label for the i-th training example
$\hat{y}_i$ is the prediction for i-th training example The most common setting for classification problems is cross-entropy loss. It increases as the predicted probability diverges from the actual label. The log of the actual predicted probability is multiplied with the ground truth class. An important aspect of this is that cross entropy loss penalizes heavily the predictions that are confident but wrong. The mathematical formulation can be described as:

$$\text{CrossEntropyLoss} = -(\hat{y}_i \log(\hat{y}_i) + (1-y_i)\log(1-y_i)) \quad (6)$$

A typical example for a regression loss is the mean square error or $L_2$ loss. As the name suggests, mean square error is measured as the average of the squared difference between predictions and actual observations. It is only concerned with the average magnitude of error irrespective of their direction. However, due to squaring, predictions which are far away from actual values are penalized heavily in comparison to less deviated predictions. Plus MSE has nice mathematical properties which makes it easier to calculate gradients. Its formulation is as follows:

$$MSE = \frac{1}{n} \cdot \sum_{i=1}^{n}(y_i - \hat{y}_i)^2$$

The following documents contain information on the functioning of convolutional neural networks:

I. Goodfellow, Y. Bengio, and A. Courville, Deep learning, chapter convolutional networks." http://www.deeplearningbook.org, 2016.

J. Wu, "Introduction to convolutional neural networks." https://pdfs.semanticscholar.org/450c/a19932fcef1ca6d0442cbf52fec38fb9d1e5.pdf. "Common loss functions in machine learning." https://towardsdatascience.com/common-loss-functions-in-machine-learning-46af0ffc4d23. Accessed: 2019-08-22.

Alex Krizhevsky, Ilya Sutskever, and Geoffrey E. Hinton, "Imagenet classification with deep convolutional neural networks." http://papers.nips.cc/paper/4824-imagenet-classification-with-deep-convolutional-neural-networks.pdf.

S. Ren, K. He, R. Girshick, and J. Sun, "Faster r-cnn: Towards real-time object detection with region proposal networks." https://arxiv.org/pdf/1506.01497.pdf.

S.-E. Wei, V. Ramakrishna, T. Kanade, and Y. Sheikh, "Convolutional pose machines." https://arxiv.org/pdf/1602.00134.pdf.

Jonathan Long, Evan Shelhamer, and Trevor Darrell, "Fully convolutional networks for semantic segmentation." https://www.cv-foundation.org/openaccess/content_cvpr_2015/papers/Long_Fully_Convolutional_Networks_2015_CVPR_paper.pdf.

In a fourth aspect, the invention is directed to a program which, when running on a computer or when loaded onto a computer, causes the computer to perform the method steps of the method according to the first to third aspect, and/or a (for example, non-transitory) program storage medium on which the program is stored or a program storage medium on which data defining the model parameters and the architecture of a learning algorithm which has been trained by executing the method according to the first aspect is stored, and/or a data carrier signal carrying the aforementioned program, and/or a data carrier signal carrying data defining the model parameters and the architecture of a learning algorithm which has been trained by executing the method according to the first aspect and/or a data stream which carries the aforementioned program, and/or a data stream which carries data defining the model parameters and the architecture of a learning algorithm which has been trained by executing the method according to the first aspect, and/or at least one computer comprising at least one processor and a memory, wherein the aforementioned program is running on the at least one processor or loaded into the memory of the computer.

The invention may alternatively or additionally relate to a (physical, for example electrical, for example technically generated) signal wave, for example a digital signal wave, such as an electromagnetic carrier wave carrying information which represents the program, for example the aforementioned program, which for example comprises code means which are adapted to perform any or all of the steps of the method according to the first aspect. The signal wave is in one example a data carrier signal carrying the aforementioned computer program. A computer program stored on a disc is a data file, and when the file is read out and transmitted it becomes a data stream for example in the form of a (physical, for example electrical, for example technically generated) signal. The signal can be implemented as the signal wave, for example as the electromagnetic carrier wave which is described herein. For example, the signal, for example the signal wave is constituted to be transmitted via a computer network, for example LAN, WLAN, WAN, mobile network, for example the internet. For example, the signal, for example the signal wave, is constituted to be transmitted by optic or acoustic data transmission. The invention according to the second aspect therefore may alternatively or additionally relate to a data stream representative of the aforementioned program, i.e. comprising the program.

In a fifth aspect, the invention is directed to a system for determining a relation between a label for indicating a position or type of an anatomical structure in a medical image on the one hand and the position or type of the anatomical structure in the medical image on the other hand, comprising:
a) a computer, wherein a program is running on the computer or loaded into the memory of the computer which causes the computer to perform the method steps of the method according to the second or third aspect;
b) at least one electronic data storage device storing the individual patient image data and, as far as the program running on the at least one processor or loaded into the memory of the computer causes the computer to execute the method according to the third aspect, the additional data and the atlas data and the individual viewing direction data and the individual anatomical vector data and the additional data; and
c) the program storage medium according to the fourth aspect, wherein the at least one computer is operably coupled to
the at least one electronic data storage device for acquiring, from the at least one electronic data storage device, the individual patient image data and, as far as the program running on the at least one processor or loaded into the memory of the computer causes the computer to execute the method according to the third aspect, the additional data and the atlas data and the individual viewing direction data and the individual anatomical vector data and the additional data and for storing, in the at least one electronic data storage device, at least the label relation data; and
the program storage medium for acquiring, from the program storage medium, the data defining the model parameters and the architecture of the learning algorithm.

For example, the invention does not involve or in particular comprise or encompass an invasive step which would represent a substantial physical interference with the body requiring professional medical expertise to be carried out and entailing a substantial health risk even when carried out with the required professional care and expertise.

Definitions

In this section, definitions for specific terminology used in this disclosure are offered which also form part of the present disclosure.

The method in accordance with the invention is for example a computer implemented method. For example, all the steps or merely some of the steps (i.e. less than the total number of steps) of the method in accordance with the invention can be executed by a computer (for example, at least one computer). An embodiment of the computer implemented method is a use of the computer for performing a data processing method. An embodiment of the computer implemented method is a method concerning the operation of the computer such that the computer is operated to perform one, more or all steps of the method.

The computer for example comprises at least one processor and for example at least one memory in order to (technically) process the data, for example electronically and/or optically. The processor being for example made of a substance or composition which is a semiconductor, for example at least partly n- and/or p-doped semiconductor, for example at least one of II—, III—, IV—, V—, VI— semiconductor material, for example (doped) silicon and/or gallium arsenide. The calculating or determining steps described are for example performed by a computer. Determining steps or calculating steps are for example steps of determining data within the framework of the technical method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term computer includes a server resource. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service. For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing (medical) imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is a virtual reality device or an augmented reality device (also referred to as virtual reality glasses or augmented reality glasses) which can be used as "goggles" for navigating. A specific example of such augmented reality glasses is Google Glass (a trademark of Google, Inc.). An augmented reality device or a virtual reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. An example of such a digital lightbox is Buzz®, a product of Brainlab AG. The monitor may also be the monitor of a portable, for example handheld, device such as a smart phone or personal digital assistant or digital media player.

The invention also relates to a computer program comprising instructions which, when on the program is executed by a computer, cause the computer to carry out the method or methods, for example, the steps of the method or methods, described herein and/or to a computer-readable storage medium (for example, a non-transitory computer-readable storage medium) on which the program is stored and/or to a computer comprising said program storage medium and/or to a (physical, for example electrical, for example technically generated) signal wave, for example a digital signal wave, such as an electromagnetic carrier wave carrying information which represents the program, for example the aforementioned program, which for example comprises code means which are adapted to perform any or all of the method steps described herein. The signal wave is in one example a data carrier signal carrying the aforementioned computer program. The invention also relates to a computer comprising at least one processor and/or the aforementioned computer-readable storage medium and for example a memory, wherein the program is executed by the processor.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The expression "acquiring data" for example encompasses (within the framework of a computer implemented method) the scenario in which the data are determined by the computer implemented method or program. Determining data for example encompasses measuring physical quantities and transforming the measured values into data, for example digital data, and/or computing (and e.g. outputting) the data by means of a computer and for example within the framework of the method in accordance with the invention. A step of "determining" as described herein for example comprises or consists of issuing a command to perform the determination described herein. For example, the step comprises or consists of issuing a command to cause a computer, for example a remote computer, for example a remote server, for example in the cloud, to perform the determination. Alternatively or additionally, a step of "determination" as described herein for example comprises or consists of receiving the data resulting from the determination described herein, for example receiving the resulting data from the remote computer, for example from that remote computer which has been caused to perform the determination. The meaning of "acquiring data" also for example encompasses the scenario in which the data are received or retrieved by (e.g. input to) the computer implemented method or program, for example from another program, a previous method step or a data storage medium, for example for further processing by the computer implemented method or program. Generation of the data to be acquired may but need not be part of the method in accordance with the invention. The expression "acquiring data" can therefore also for example mean waiting to receive data and/or receiving the data. The received data can for example be inputted via an interface. The expression "acquiring data" can also mean that the computer implemented method or program performs steps in order to (actively) receive or retrieve the data from a data source, for instance a data storage medium (such as for example a ROM, RAM, database, hard drive, etc.), or via the interface (for instance, from another computer or a network). The data acquired by the disclosed method or device, respectively, may be acquired from a database located in a data storage device which is operably to a computer for data transfer between the database and the computer, for example from the database to the computer. The computer acquires the data for use as an input for steps of determining data. The determined data can be output again to the same or another database to be stored for later use. The database or database used for implementing the disclosed method can be located on network data storage device or a network server (for example, a cloud data storage device or a cloud server) or a local data storage device (such as a mass storage device operably connected to at least one computer executing the disclosed method). The data can be made "ready for use" by performing an additional step before the acquiring step. In accordance with this additional step, the data are generated in order to be acquired. The data are for example detected or captured (for example by an analytical device). Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. In particular, the acquiring step does not involve an invasive step which would represent a substantial physical interference with the body, requiring professional medical expertise to be carried out and entailing a substantial health risk even when carried out with the required professional care and expertise. In particular, the step of acquiring data, for example determining data, does not involve a surgical step and in particular does not involve a step of treating a human or animal body using surgery or therapy. In order to distinguish the different data used by the present method, the data are denoted (i.e. referred to) as "XY data" and the like and are defined in terms of the information which they describe, which is then preferably referred to as "XY information" and the like.

It is the function of a marker to be detected by a marker detection device (for example, a camera or an ultrasound receiver or analytical devices such as CT or MRI devices) in such a way that its spatial position (i.e. its spatial location and/or alignment) can be ascertained. The detection device is for example part of a navigation system. The markers can be active markers. An active marker can for example emit electromagnetic radiation and/or waves which can be in the infrared, visible and/or ultraviolet spectral range. A marker can also however be passive, i.e. can for example reflect electromagnetic radiation in the infrared, visible and/or ultraviolet spectral range or can block x-ray radiation. To this end, the marker can be provided with a surface which has corresponding reflective properties or can be made of metal in order to block the x-ray radiation. It is also possible for a marker to reflect and/or emit electromagnetic radiation and/or waves in the radio frequency range or at ultrasound wavelengths. A marker preferably has a spherical and/or spheroid shape and can therefore be referred to as a marker sphere; markers can however also exhibit a cornered, for example cubic, shape.

A marker device can for example be a reference star or a pointer or a single marker or a plurality of (individual) markers which are then preferably in a predetermined spatial relationship. A marker device comprises one, two, three or more markers, wherein two or more such markers are in a predetermined spatial relationship. This predetermined spatial relationship is for example known to a navigation system and is for example stored in a computer of the navigation system.

In another embodiment, a marker device comprises an optical pattern, for example on a two-dimensional surface. The optical pattern might comprise a plurality of geometric shapes like circles, rectangles and/or triangles. The optical pattern can be identified in an image captured by a camera, and the position of the marker device relative to the camera can be determined from the size of the pattern in the image, the orientation of the pattern in the image and the distortion of the pattern in the image. This allows determining the relative position in up to three rotational dimensions and up to three translational dimensions from a single two-dimensional image.

The position of a marker device can be ascertained, for example by a medical navigation system. If the marker device is attached to an object, such as a bone or a medical instrument, the position of the object can be determined from the position of the marker device and the relative position between the marker device and the object. Determining this relative position is also referred to as registering the marker device and the object. The marker device or the object can be tracked, which means that the position of the marker device or the object is ascertained twice or more over time.

Preferably, atlas data is acquired which describes (for example defines, more particularly represents and/or is) a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data. The atlas data comprises image information (for example, positional image information) which can be matched (for example by applying an elastic or rigid image fusion algorithm) for example to image information (for example, positional image information) contained in medical image data so as to for example compare the atlas data to the medical image data in order to determine the position of anatomical structures in the medical image data which correspond to anatomical structures defined by the atlas data.

The human bodies, the anatomy of which serves as an input for generating the atlas data, advantageously share a common feature such as at least one of gender, age, ethnicity, body measurements (e.g. size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel)

of the image data to an object of the matched atlas, thereby segmenting the image data into objects.

For example, the atlas data includes information of the anatomical body part. This information is for example at least one of patient-specific, non-patient-specific, indication-specific or non-indication-specific. The atlas data therefore describes for example at least one of a patient-specific, non-patient-specific, indication-specific or non-indication-specific atlas. For example, the atlas data includes movement information indicating a degree of freedom of movement of the anatomical body part with respect to a given reference (e.g. another anatomical body part). For example, the atlas is a multimodal atlas which defines atlas information for a plurality of (i.e. at least two) imaging modalities and contains a mapping between the atlas information in different imaging modalities (for example, a mapping between all of the modalities) so that the atlas can be used for transforming medical image information from its image depiction in a first imaging modality into its image depiction in a second imaging modality which is different from the first imaging modality or to compare (for example, match or register) images of different imaging modality with one another.

In the field of medicine, imaging methods (also called imaging modalities and/or medical imaging modalities) are used to generate image data (for example, two-dimensional or three-dimensional image data) of anatomical structures (such as soft tissues, bones, organs, etc.) of the human body. The term "medical imaging methods" is understood to mean (advantageously apparatus-based) imaging methods (for example so-called medical imaging modalities and/or radiological imaging methods) such as for instance computed tomography (CT) and cone beam computed tomography (CBCT, such as volumetric CBCT), x-ray tomography, magnetic resonance tomography (MRT or MRI), conventional x-ray, sonography and/or ultrasound examinations, and positron emission tomography. For example, the medical imaging methods are performed by the analytical devices. Examples for medical imaging modalities applied by medical imaging methods are: X-ray radiography, magnetic resonance imaging, medical ultrasonography or ultrasound, endoscopy, elastography, tactile imaging, thermography, medical photography and nuclear medicine functional imaging techniques as positron emission tomography (PET) and Single-photon emission computed tomography (SPECT). The image data thus generated is also termed "medical imaging data". Analytical devices for example are used to generate the image data in apparatus-based imaging methods. The imaging methods are for example used for medical diagnostics, to analyse the anatomical body in order to generate images which are described by the image data.

The imaging methods are also for example used to detect pathological changes in the human body. However, some of the changes in the anatomical structure, such as the pathological changes in the structures (tissue), may not be detectable and for example may not be visible in the images generated by the imaging methods. A tumour represents an example of a change in an anatomical structure. If the tumour grows, it may then be said to represent an expanded anatomical structure. This expanded anatomical structure may not be detectable; for example, only a part of the expanded anatomical structure may be detectable. Primary/high-grade brain tumours are for example usually visible on MRI scans when contrast agents are used to infiltrate the tumour. MRI scans represent an example of an imaging method. In the case of MRI scans of such brain tumours, the signal enhancement in the MRI images (due to the contrast agents infiltrating the tumour) is considered to represent the solid tumour mass. Thus, the tumour is detectable and for example discernible in the image generated by the imaging method. In addition to these tumours, referred to as "enhancing" tumours, it is thought that approximately 10% of brain tumours are not discernible on a scan and are for example not visible to a user looking at the images generated by the imaging method.

BRIEF DESCRIPTION OF THE DRAWINGS

In the following, the invention is described with reference to the appended figures which give background explanations and represent specific embodiments of the invention.

The scope of the invention is however not limited to the specific features disclosed in the context of the figures, wherein

FIGS. 7a, 7b and 7c explain three embodiments of the method according to the first and second aspects which use the anatomical vector for creating a ground truth;

FIGS. 9a and 9b explain an embodiment of the methods according to the first and second aspects which uses the anatomical vector as additional input (as raw numbers);

FIGS. 10a and 10b explain an embodiment of the methods according to the first and second aspects which uses the anatomical vector as additional input (as raw numbers);

FIGS. 11a and 11b explain an embodiment of the methods according to the first and second aspects which uses the anatomical vector for constraining an atlas;

FIGS. 12a and 12b explain an embodiment of the methods according to the first and second aspects which uses the anatomical vector for classification/segmentation/localization;

DESCRIPTION OF EMBODIMENTS

Figure 1:
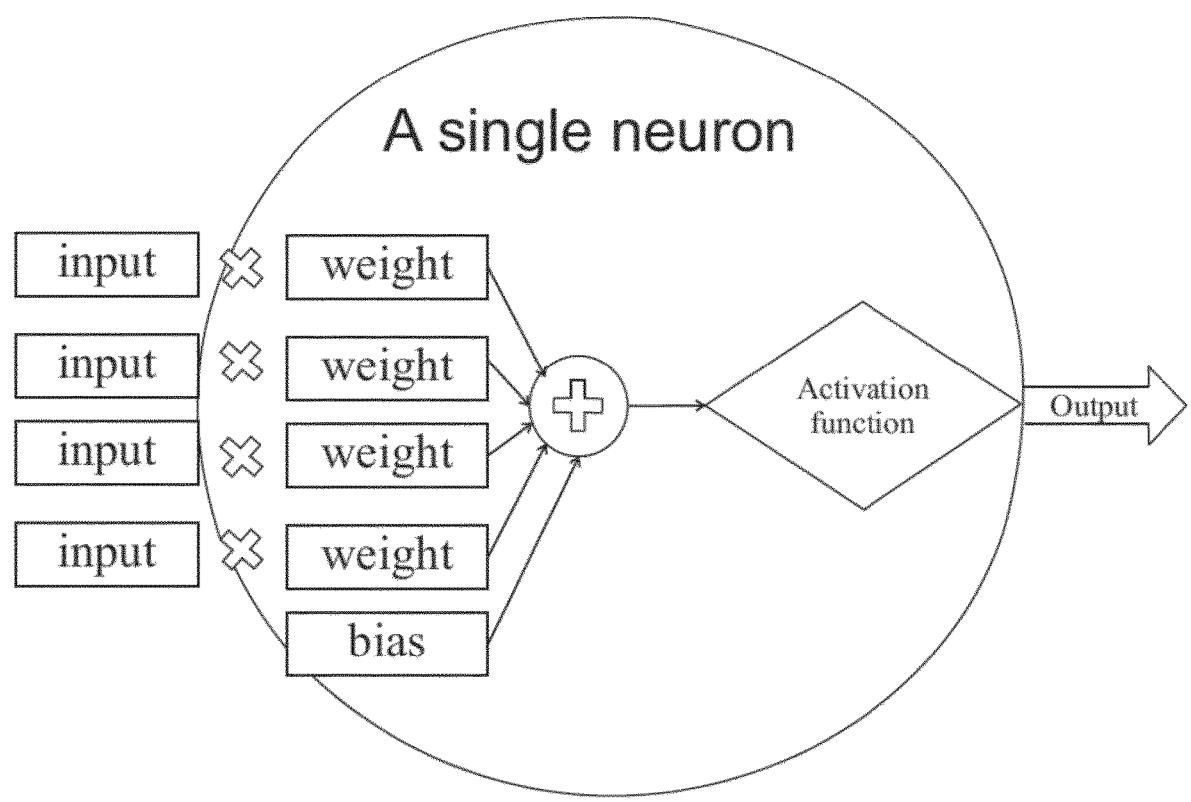
FIG. 1 illustrates a neuron of a neural network.

FIG. 1 illustrates the structure of a neuron as part of a neural network, for example a convolutional neural network, in which input is assigned certain weights for processing by an activation function which generates the output of the neuron.

Figure 2:
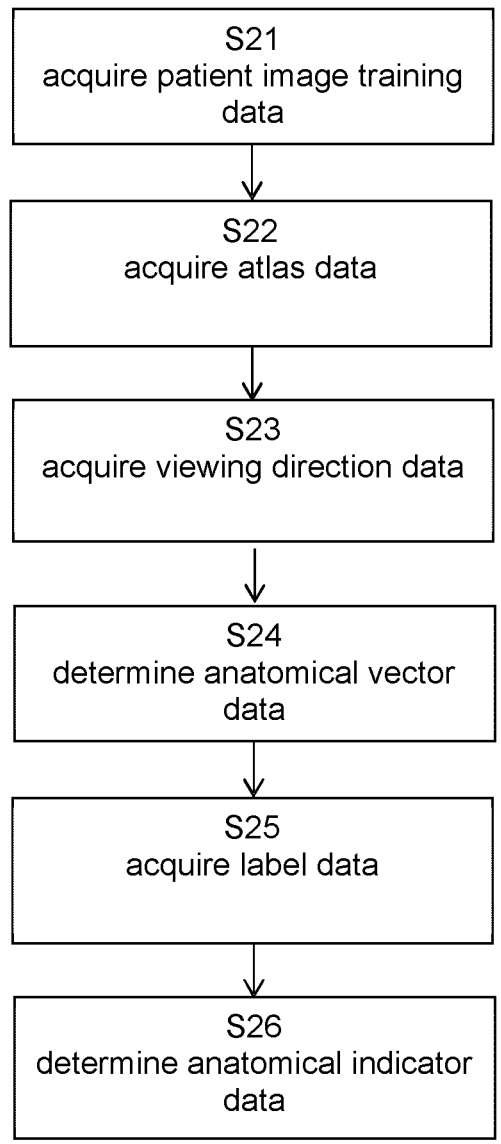
FIG. 2 shows a basic flow of the method according to the first aspect.

FIG. 2 describes the basic flow of the method according to the first aspect, which starts in step S21 with acquiring the patient training image data, continues to step S22 which encompasses acquisition of the atlas data, and then proceeds to acquiring the viewing direction data in step S23. On that basis, step S24 calculates the anatomical vector data, which is followed by acquisition of the label data in step S25. Finally, the anatomical indicator data is determined in step S26.

Figure 3:
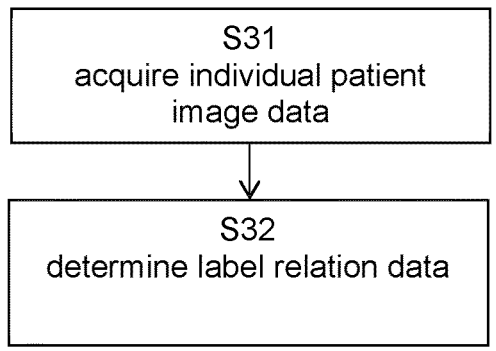
FIG. 3 shows a basic flow of the method according to the second aspect.

FIG. 3 illustrates the basic steps of the method according to the second aspect, in which step S31 encompasses acquisition of the individual patient image data and step 32 determines the label relation data.

Figure 4:
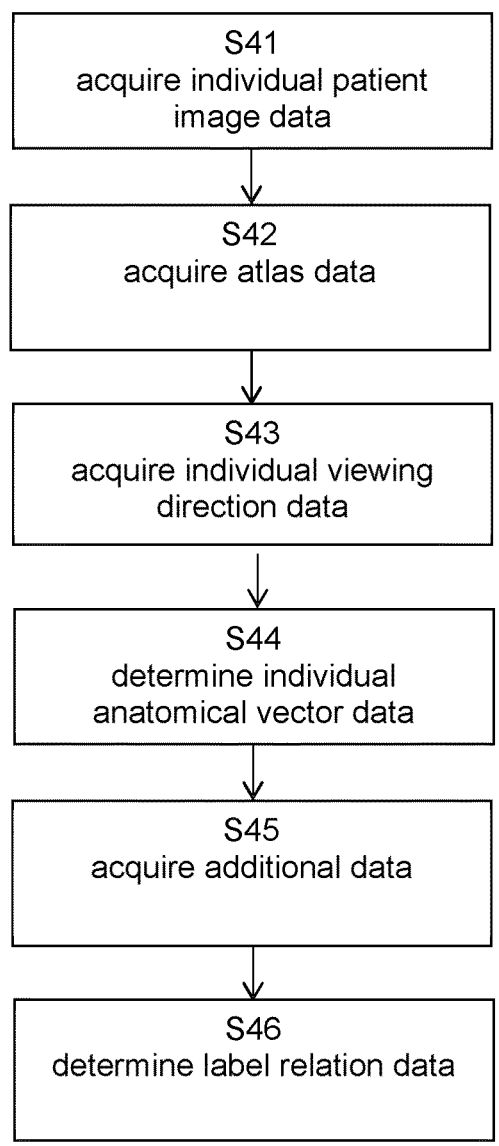
FIG. 4 shows a basic flow of the method according to the third aspect.

FIG. 4 illustrates the basic steps of the method according to the third aspect, in which step S41 encompasses acquisition of the individual patient image data and step 42 acquires the atlas data. Subsequent step 43 acquires the individual viewing direction data, followed by determination of the individual anatomical vector data in step S44. The additional data is acquired in step S45. Then, step S46 determines the label relation data.

Figure 5:
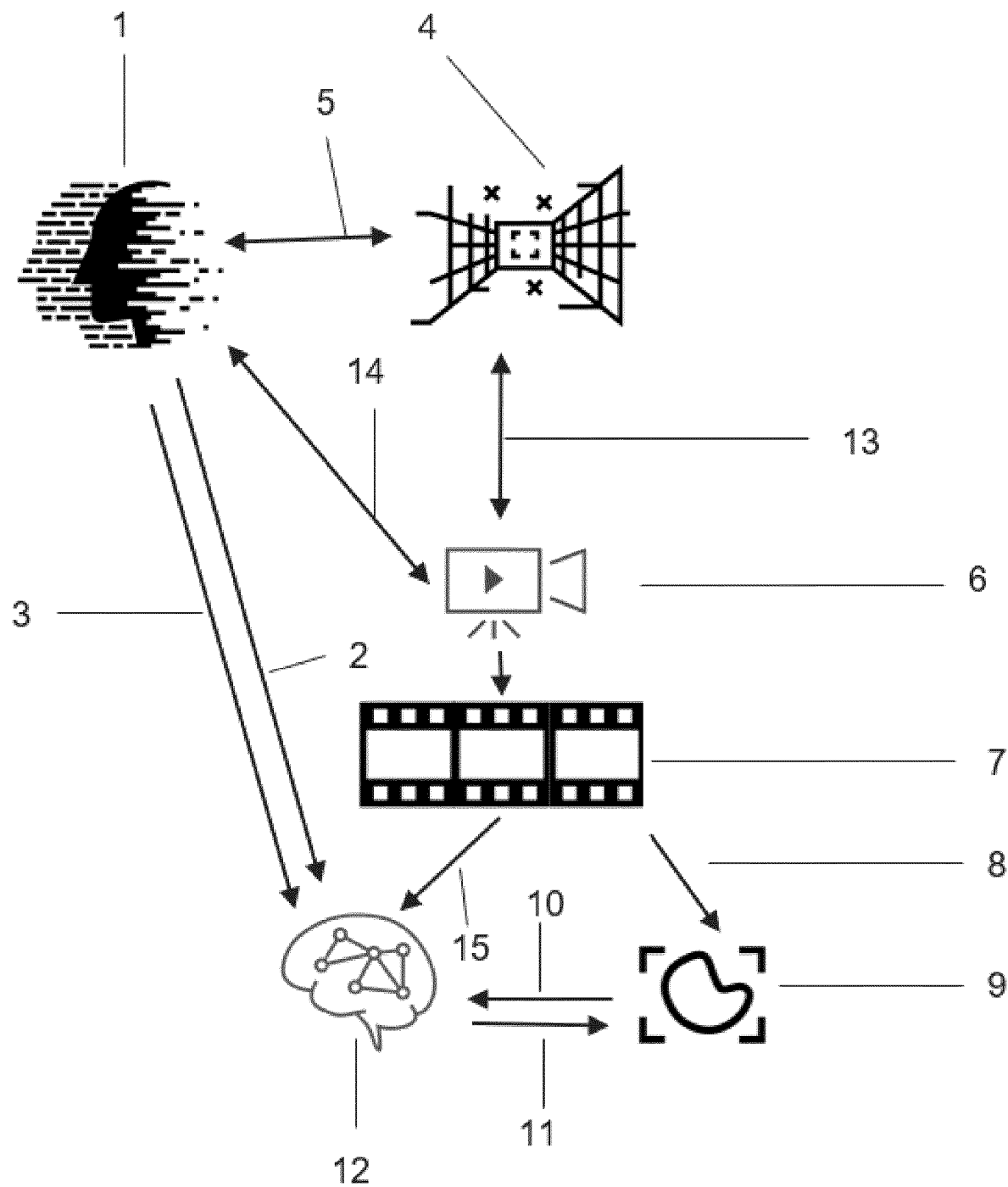
FIG. 5 shows an application of the method according to the first to third aspect.

FIG. 5 gives an overview of the application of the method according to the first to third aspect. A generic patient model (atlas) 1 and a tracked imaging device 6 are registered to the patient space 4 via a registration 5 between the atlas 1 and the patient space 4 (using e.g. 3D tomography image data as planning data of a specific patient and elastic registration to an atlas) and via registration 13 between the patient space 4 and the tracked image device 6. Both registrations 5 and 13 can be combined into a registration 14 between the atlas 1 and the tracked imaging device 6. The tracked imaging device 6 generates medical images 7, and labels 9 are generated 8 for these images for example from the atlas 1 or manually. An anatomical vector is determined via the registration 14 which is based on 5 and 13 and the known viewing direction of the tracked imaging device 6.

During learning, the medical images 7 are input 15 into a learning algorithm 12. The anatomical vector determined using the atlas 1 is input 2 into the learning algorithm 12. The labels 9 are input 10 into the learning algorithm 12. Optionally, the atlas 1 is input 3 into the learning algorithm 12. Thereby, during learning, a relation between the labels 9 and an anatomical structure depicted by the medical images 7 is determined based on the input 2, 10, 15 and optionally 3.

During testing or using of the learning algorithm, medical images 7 are input 15 into the learning algorithm 12. An anatomical vector determined using the atlas 1 is input 2 into the learning algorithm 12. Optionally, the atlas 1 is input 3 into the learning algorithm 12. Labels 9 are determined 11 by the learning algorithm based on the input 2 and 15 and optionally 3.

Figure 6:
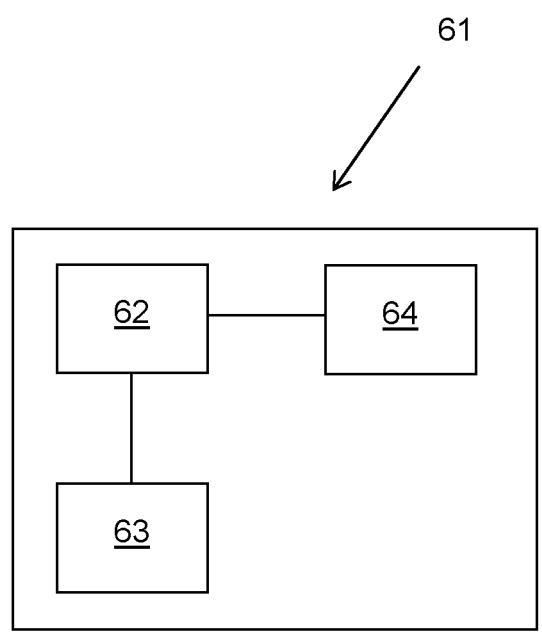
FIG. 6 is a schematic illustration of the system according to the fifth aspect.

FIG. 6 is a schematic illustration of the medical system 61 according to the fifth aspect. The system is in its entirety identified by reference sign 61 and comprises a computer 62, an electronic data storage device (such as a hard disc) 63 for storing at least the data stored by the system according to the fifth aspect. The components of the medical system 1 have the functionalities and properties explained above with regard to the fifth aspect of this disclosure.

FIGS. 7a, 7b and 7c explain embodiments 1 to 3 of the method according to the first and second aspects which use the anatomical vector for creating a ground truth.

FIG. 7a shows that embodiment 1 uses the method according to the second aspect for segmentation or localization of image features, and a ground truth segmentation is created using the anatomical vector from an atlas registered with a patient image. For the training according to the method according to the first aspect, video images and a ground truth segmentation are input to the learning algorithm embodied by a machine learning algorithm. When testing the trained algorithm using the method according to the second aspect, video images are input to the algorithm. The output of the algorithm then is a segmentation or localization of an image feature. The training is conducted in a supervised manner. The registrations mentioned above in the context of FIG. 5 are elastic registrations and updated during the medical procedure carried out on the patient.

FIG. 7a also shows that embodiment 2 uses the method according to the second aspect for classification of image features, and a ground truth class is created using the anatomical vector from an atlas registered with a patient image. For the training according to the method according to the first aspect, video images and a ground truth class are input to the learning algorithm embodied by a machine learning algorithm.

When testing the trained algorithm using the method according to the second aspect, video images are input to the algorithm. The output of the algorithm then is a class of an image feature. The training is conducted in a supervised manner. The registrations mentioned above in the context of FIG. 5 are rigid or better registrations, but generally depend on the image content that shall be classified.

Furthermore, FIG. 7a shows that embodiment 3 uses the method according to the second aspect for segmentation or localization of image features, and a class is created using the anatomical vector from an atlas registered with a patient image. For the training according to the method according to the first aspect, video images and a class are input to the learning algorithm embodied by a machine learning algorithm.

When testing the trained algorithm using the method according to the second aspect, video images are input to the algorithm. The output of the algorithm then is a segmentation or localization of an image feature. The training is conducted in a weakly supervised manner. The registrations mentioned above in the context of FIG. 5 are rigid or better registrations, but generally depend on the image content that shall be localized.

FIG. 7b illustrates that the anatomical vector is used by embodiments 1 and 2 during training of the algorithm to create a ground truth embodied by a label. The ground truth together with video data is fed in the machine learning (ML) algorithm to generate a label by using the ML algorithm.

FIG. 7c illustrates that the anatomical vector is used by embodiment 3 during training of the algorithm to create a class embodied by a label. The class together with video data is fed in the machine learning (ML) algorithm to generate a label by using the ML algorithm.

Figures 8A, 8B:
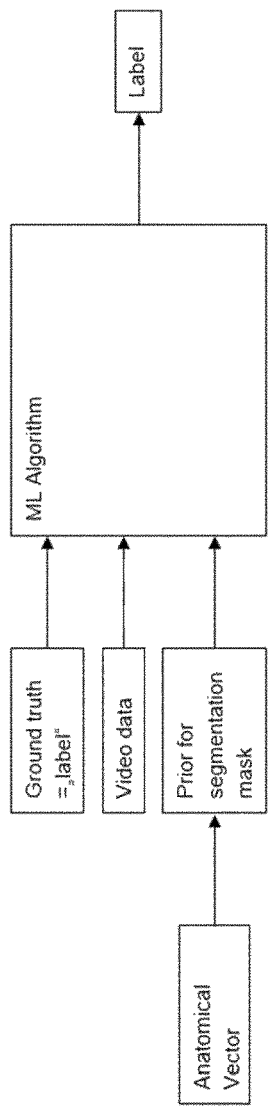
FIGS. 8a and 8b explain an embodiment of the method according to the first and second aspects which uses the anatomical vector for creating a prior for a segmentation mask.

FIGS. 8a and 8b explain embodiment 4 of the method according to first and second aspects which uses the anatomical vector for creating a prior for a segmentation mask.

FIG. 8a shows that embodiment 4 uses the method according to the second aspect for segmentation or localization of image features, and a prior for the segmentation mask is created using the anatomical vector. For the training according to the method according to the first aspect, video images, the prior for the segmentation mask, and the ground truth segmentation are input to the learning algorithm embodied by a machine learning algorithm. When testing the trained algorithm using the method according to the second aspect, video images and a prior are input to the algorithm.

The output of the algorithm then is a segmentation or localization of an image feature.

The training is conducted in a supervised manner. The registrations mentioned above in the context of FIG. 5 are elastic registrations and updated during the medical procedure carried out on the patient.

FIG. 8b illustrates that the anatomical vector is used to create a prior for a segmentation mask which together with a ground truth embodied by a label and video data is fed in the machine learning (ML) algorithm to generate a label by using the ML algorithm.

FIGS. 9a and 9b explain embodiment 5 of the methods according to first and second aspects which uses the anatomical vector as additional input (as raw numbers).

FIG. 9a shows that embodiment 5 uses the method according to the second aspect for classification or segmentation or localization of image features, and the anatomical vector is used as additional input (for example as raw numbers) to the learning algorithm. For the training according to the method according to the first aspect, video images, the corresponding anatomical vectors and the manually created label, are input to the learning algorithm embodied by a machine learning algorithm. When testing the trained algorithm using the method according to the second aspect, video images and anatomical vectors are input to the algorithm. The output of the algorithm then is a class of an image feature or a segmentation or localization of an image feature. The training is conducted in a supervised manner. The registrations mentioned above in the context of FIG. 5 depend on the type of application.

FIG. 9b illustrates that the anatomical vector is input together with a ground truth embodied by a label and video data into the machine learning (ML) algorithm to generate a label by using the ML algorithm.

FIGS. 10a and 10b explain embodiment 6 of the methods according to first and second aspects which uses the anatomical vector as additional input (as raw numbers).

FIG. 10a shows that embodiment 6 uses the method according to the second aspect for classification or segmentation or localization of image features, and the anatomical vector is used as additional input (for example as raw numbers) to the learning algorithm. For the training according to the method according to the first aspect, video images, anatomical vectors, an undeformed atlas and a manually created label are input to the learning algorithm embodied by a machine learning algorithm. When testing the trained algorithm using the method according to the second aspect, video images and anatomical vectors and an undeformed atlas are input to the algorithm.

The output of the algorithm then is a class of an image feature or a segmentation or localization of an image feature. The training is conducted in a supervised manner.

The registrations mentioned above in the context of FIG. 5 depend on the type of application.

FIG. 10b illustrates that the anatomical vector is input together with a ground truth embodied by a label, video data and the undeformed atlas into the machine learning (ML) algorithm to generate a label by using the ML algorithm.

FIGS. 11a and 11b explain embodiment 7 of the methods according to first and second aspects which uses the anatomical vector for constraining an atlas.

FIG. 11a shows that embodiment 7 uses the method according to the second aspect for classification or segmentation or localization of image features, and the anatomical vector is used for constraining an atlas. For the training according to the method according to the first aspect, video images and the constrained undeformed atlas are input together with a manually created label to the learning algorithm embodied by a machine learning algorithm. When testing the trained algorithm using the method according to the second aspect, video images and a constrained undeformed atlas are input to the algorithm. The output of the algorithm then is a class of an image feature or a segmentation or localization of an image feature. The training is conducted in a supervised manner. The registrations mentioned above in the context of FIG. 5 are rigid or better.

FIG. 11b illustrates that the anatomical vector is used to generate the constrained atlas which input together with a ground truth embodied by a label and video data into the machine learning (ML) algorithm to generate a label by using the ML algorithm.

FIGS. 12a and 12b explain embodiment 8 of the methods according to first and second aspects which uses the anatomical vector for classification/segmentation/localization.

FIG. 12a shows that embodiment 8 uses the method according to the second aspect for classification or segmentation or localization of image features, and the anatomical vector is used for creation of a ground truth for a first-stage body part classifier. For the training according to the method according to the first aspect, video images and the ground truth are input in a first stage to the learning algorithm embodied by a machine learning algorithm. In a second stage, the label is input to the another algorithm which does not have to be a learning algorithm. When testing the trained algorithm using the method according to the second aspect, video images are input to the algorithm in a first stage, and in a second stage, the label output by the learning algorithm is input into the other algorithm. For example, the label undergoes further data processing after it has been output by the learning algorithm. The other algorithm may for example another learning algorithm for segmenting the anatomical body part visible in the individual medical image identified by the label. The output of the algorithm then is a class of an image feature or a segmentation or localization of an image feature. The training is conducted in a supervised manner. The registrations mentioned above in the context of FIG. 5 are rigid or better.

FIG. 12b illustrates that the anatomical vector is used to generate the ground truth embodied by a body part label which is input together with video data into the machine learning (ML) algorithm to generate a body part label by using the ML algorithm. In a second stage, the body part label is input to another algorithm.

Figures 13A, 13B:
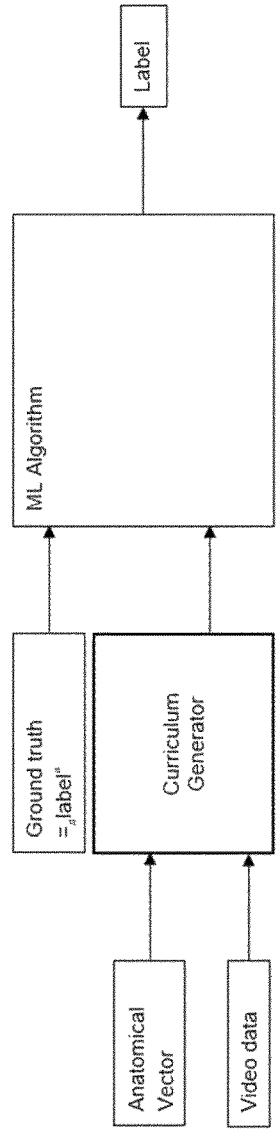
FIGS. 13a and 13b explain an embodiment of the methods according to the first and second aspects which uses the anatomical vector for classification/segmentation/localization.

FIGS. 13a and 13b explain embodiment 9 of the methods according to first and second aspects which uses the anatomical vector for classification/segmentation/localization.

FIG. 13a shows that embodiment 9 uses the method according to the second aspect for classification or segmentation or localization of image features, and the anatomical vector is used for creation of ground truth a curriculum data pool. Curriculum means a stepwise increase in the complexity of the training data in different steps of the training.

For the training according to the method according to the first aspect, any applicable kind of data is input to the learning algorithm embodied by a machine learning algorithm. The order in which the training data is input is controlled by the curriculum.

When testing the trained algorithm using the method according to the second aspect, the other kind of data is input to the algorithm. The output of the algorithm then is a class of an image feature or a segmentation of an image feature. The training is conducted in a supervised manner. The registrations mentioned above in the context of FIG. 5 are rigid or better.

FIG. 13b illustrates that the anatomical vector is input together with the ground truth and video data into a curriculum generator, the output of which is input to the machine learning (ML) algorithm to generate a label by using the ML algorithm.

The invention claimed is:

1. A computer-implemented method of training a learning algorithm for determining a relation between a label for indicating a position or type of an anatomical structure in a medical image and the position or type of the anatomical structure in the medical image comprising:
   acquiring patient training image data which describes digital medical images of an anatomical structure of a plurality of patients;
   acquiring atlas data which describes an anatomical model of an anatomical body part including the anatomical structure;
   acquiring viewing direction data which describes the viewing direction of an imaging device towards the anatomical structure at the point in time when the imaging device was used to generate the medical image;
   determining anatomical vector data based on the viewing direction data and the atlas data, wherein the anatomical vector data describes an anatomical vector which is a result of transforming the viewing direction into a reference system in which positions in the anatomical model are defined;
   acquiring label data which describes a label describing the position or type of the anatomical structure in the anatomical model; and
   determining anatomical indicator data based on the patient training image data and the anatomical vector data and the label data, wherein the anatomical indicator data describes model parameters of a learning algorithm for establishing the relation between the position or type of the anatomical structure described by the medical image and the label, wherein the anatomical indicator data is determined by inputting the patient training image data and the label data into a function which establishes the relation.

2. The method according to claim 1, wherein the medical image is a two-dimensional image, and wherein the imaging device is one of a microscope, an endoscope equipped with a digital camera, or an x-ray device that is configured to produce two-dimensional projection images.

3. The method according to claim 1, wherein the anatomical indicator data is determined by additionally inputting a subset of the atlas data which has been determined based on the atlas data and the anatomical vector data into the function which establishes the relation.

4. The method according to claim 1, further comprising acquiring additional data which is a function of the anatomical vector; and
   determining the anatomical indicator data by inputting the additional data into the function which establishes the relation.

5. The method according to claim 1, wherein the additional data includes the anatomical vector data.

6. The method according to claim 1, wherein the learning algorithm is a machine learning algorithm.

7. The method according to claim 1, wherein the learning algorithm is a convolutional neural network.

8. The method according to claim 1, wherein the model parameters define learnable parameters, of the learning algorithm.

9. A computer-implemented method of determining a relation between a label for indicating a position or type of an anatomical structure in a medical image and the position or type of the anatomical structure in the medical image, the method comprising:
   acquiring individual patient image data which describes a digital individual medical image of an anatomical structure of an individual patient; and
   determining label relation data which describes a relation between the label and the anatomical structure in the individual medical image;
   wherein the label relation data is trained by inputting the individual patient image data into a function which establishes the relation between the anatomical structure described by the individual medical image and the label.

10. A computer-implemented method of determining a relation between a label for indicating a position or type of an anatomical structure in a medical image and the position or type of the anatomical structure in the medical image, the method comprising:
    acquiring individual patient image data which describes a digital individual medical image of an anatomical structure of an individual patient;
    acquiring atlas data which describes an anatomical model of an anatomical body part including the anatomical structure;
    acquiring individual viewing direction data which describes a viewing direction of an imaging device towards the anatomical structure at the point in time when the imaging device was used to generate the individual medical image;
    determining individual anatomical vector data based on the individual viewing direction data and the atlas data, wherein the anatomical vector data describes an anatomical vector which is a result of transforming the viewing direction into a reference system in which positions in the anatomical model are defined;
    acquiring additional data which is a function of the individual anatomical vector; and
    determining label relation data which describes a relation between a label and the anatomical structure described by the individual medical image, wherein the label relation data is determined by inputting the individual patient image data and the additional data into a trained model which establishes the relation between the position or type of the anatomical structure in the individual medical image and the label.

11. The method according to the claim 10, wherein the label relation data is determined additionally based on the atlas data.

12. The method according to claim 10, wherein the individual medical image is a two-dimensional image and wherein the imaging device is a microscope.

13. The method according to claim 10, wherein a relative position between the imaging device, used for generating the individual patient image data, and the individual anatomical vector data is predetermined, and wherein the imaging device is a microscope.

14. The method according to claim 10, wherein the trained model comprises a convolutional neural network.

15. A non-transitory computer readable medium comprising a set of instructions which, when running on at least one processor, causes the at least one processor to:
    acquire patient training image data which describes digital medical images of an anatomical structure of a plurality of patients;
    acquire atlas data which describes an anatomical model of an anatomical body part including the anatomical structure;
    acquire viewing direction data which describes the viewing direction of an imaging device towards the anatomical structure at the point in time when the imaging device was used to generate the medical image;

determine anatomical vector data based on the viewing direction data and the atlas data, wherein the anatomical vector data describes an anatomical vector which is a result of transforming the viewing direction into a reference system in which positions in the anatomical model are defined;

acquire label data which describes a label describing the position or type of the anatomical structure in the anatomical model; and determine anatomical indicator data based on the patient training image data and the anatomical vector data and the label data, wherein the anatomical indicator data describes model parameters of a learning algorithm for establishing the relation between the position or type of the anatomical structure described by the medical image and the label, wherein the anatomical indicator data is determined by inputting the patient training image data and the label data into a function which establishes the relation.

\* \* \* \* \*